United States Patent
Elston et al.

(10) Patent No.: US 8,141,848 B2
(45) Date of Patent: Mar. 27, 2012

(54) PISTON WITH INTEGRAL SEALS FOR A WATER SOFTENER CONTROL VALVE

(75) Inventors: Andrew C. Elston, Sterling, IL (US); Kenneth J. Sieth, Delafield, WI (US); Gregory E. Sund, Poplar Grove, IL (US); Mark S. Miller, Rockford, IL (US)

(73) Assignee: Pentair Residential Filtration, LLC, Golden Valley, MN (US)

( * ) Notice: Subject to any disclaimer, the term of this patent is extended or adjusted under 35 U.S.C. 154(b) by 1643 days.

(21) Appl. No.: 11/041,449

(22) Filed: Jan. 24, 2005

(65) Prior Publication Data

US 2006/0162790 A1    Jul. 27, 2006

(51) Int. Cl.
*F16K 3/24*    (2006.01)
(52) U.S. Cl. .... 251/324; 277/407; 277/575; 137/625.48
(58) Field of Classification Search ........... 251/324, 251/332, 357, 365; 277/402, 407, 435, 437, 277/491, 575, 586, 587, 584, 644, 650; 137/625.48, 137/625.67, 625.69
See application file for complete search history.

(56) References Cited

U.S. PATENT DOCUMENTS

| | | | |
|---|---|---|---|
| 2,585,556 A * | 2/1952 | Johnson, Jr. ............... 251/26 |
| 2,841,429 A * | 7/1958 | McCuistion ................ 277/587 |
| 2,886,284 A * | 5/1959 | Wheatley ................... 251/358 |
| 2,908,480 A * | 10/1959 | Hamer ....................... 251/328 |
| 3,049,239 A * | 8/1962 | Rudelick ..................... 210/275 |
| 3,215,441 A * | 11/1965 | Horvereid ................... 277/437 |
| 3,426,799 A * | 2/1969 | Kintner .................. 137/625.48 |
| 3,575,431 A * | 4/1971 | Bryant ........................ 277/641 |
| 3,612,483 A * | 10/1971 | Pool ........................... 251/306 |
| 3,630,485 A * | 12/1971 | Williams ..................... 251/307 |
| 3,874,412 A | 4/1975 | Fleckenstein et al. |
| 3,909,017 A * | 9/1975 | Engstrom .................... 277/586 |
| 3,929,161 A * | 12/1975 | Boelkins ................. 137/625.69 |
| 3,968,971 A * | 7/1976 | Mariaulle .................... 277/561 |
| 4,345,739 A * | 8/1982 | Wheatley .................... 251/358 |
| 4,522,374 A * | 6/1985 | Neff ........................... 251/356 |
| 5,190,078 A * | 3/1993 | Stoll et al. .............. 137/625.69 |
| 5,250,187 A | 10/1993 | Franks |
| 5,513,674 A * | 5/1996 | Frisch ..................... 137/625.69 |
| 5,609,343 A * | 3/1997 | Asou et al. .................. 277/552 |
| 5,910,244 A | 6/1999 | Stamos et al. |
| 6,402,944 B1* | 6/2002 | Vaughan ..................... 210/190 |

* cited by examiner

*Primary Examiner* — John Fox
(74) *Attorney, Agent, or Firm* — Quarles & Brady LLP

(57) ABSTRACT

A piston for a control valve of a water treatment apparatus includes a body having a central portion from which at least one flange projects radially outward. Each flange has an outer peripheral surface extending around the central portion with an annular groove therein. The annular groove is undercut thereby having a width that increases from the peripheral surface radially inward into the flange. A separate sealing ring is molded into the groove of each flange and is captivated therein by the undercut of the groove. That captivation better enables each sealing ring to resist forces produced by the water flowing through the control valve without becoming dislodged from the flange.

14 Claims, 1 Drawing Sheet

PISTON WITH INTEGRAL SEALS FOR A WATER SOFTENER CONTROL VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to apparatus for softening water; and more particularly to systems for controlling regeneration of the resin in a water softening apparatus.

It is quite common for water drawn from a well to be considered "hard" in that it contains di-positive and sometimes tri-positive ions which have leached from mineral deposits in the earth. Such ions form insoluble salts with common detergents and soaps producing precipitates that increase the quantity of detergent or soap required for cleaning purposes. When hard water is used in boilers, evaporation results in the precipitation of insoluble residues that tend to accumulate as scale.

It is standard practice to install a water softener in the plumbing system of a building that is supplied with hard water. The most common kind of water softener is an ion exchange apparatus that has a tank which holds a bed of resin through which the hard water flows to remove undesirable minerals and other impurities. Binding sites in the resin bed initially contain positive ions, commonly unipositive sodium or potassium ions. As hard water enters the resin, competition for the binding sites occurs. The di-positive and tri-positive ions in the hard water are favored due to their higher charge densities and displace the unipositive ions. Two or three unipositive ions are displaced for each di-positive or tri-positive ion, respectively.

The capacity of the rein bed to absorb minerals and impurities is finite and eventually ceases to soften the water when a large percentage of the sites become occupied by the di-positive and tri-positive ions. When this occurs, it becomes necessary to recharge or regenerate the resin bed by flushing it with a regenerant, typically a solution of sodium chloride or potassium chloride. The concentration of unipositive ions in the regenerant is sufficiently high to offset the unfavorable electrostatic competition and the binding sites are recovered by unipositive ions. The interval of time between regeneration periods during which water softening takes place is referred to as a service mode of operation.

Regeneration of early types of water softeners was affected manually only after it was discovered that the treatment capacity of the resin bed has been exceeded and the water flowing there through is no longer "soft." In an effort to eliminate the need for manual regeneration, water softener control systems were provided with a mechanical clock which initiated water softener regeneration on a periodic basis. The frequency of such regeneration was set in accordance to the known capacity of the resin bed and the anticipated daily usage of soft water. Although mechanical clock-type water softener controllers alleviated the need for manually regenerating the resin bed, such controllers are subject to the disadvantage that regeneration at fixed intervals may occur too often or not often enough depending upon water usage. Regenerating the water softener resin bed when sufficient capacity to treat water still exists wastes the regenerant and the water used in regeneration. Conversely, failure to regenerate the water softener after the resin bed capacity has diminished to a point below that required to treat hard water may result in hard water leaving the water softener.

In an effort to better regulate the frequency of water softener regeneration, demand-type water softener controls have been developed which determine the remaining capacity of the resin bed to soften water. One type of such an improved control system employed a flow meter that measures the volume of water being treated and regenerates the resin bed when a specified volume of water has flowed through the softener since the previous regeneration. While this type of system is adequate in many installations, municipal systems alternately may draw water from several wells which contain water having different degrees of hardness. In that case, the exhaustion of the resin bed is not a direct function of the volume of water which has been treated since the previous regeneration.

Other types of control systems were developed which detect the exhaustion of the resin bed directly. Electronic controllers utilize electrodes to measure the electrical conductivity of the resin bed at two spaced apart locations. The ratio of the conductivity measurements, along with the minimum and maximum ratio values that occurred since the previous resin bed regeneration, are used to determine a probability of resin bed exhaustion and this triggers regeneration.

Regardless of the type of control system used to determine when to regenerate the resin bed, that control system activates a motor that drives a valve. The valve has several positions corresponding to the backwashing, brining, rinsing and brine replenishing steps of the regeneration process. The conventional valves have a body with a bore that has several chambers to which the inlet, outlet and internal passages of the water softener are connected. A piston with recesses and lands slides within the bore to selectively interconnect the different chambers and thereby direct water in different paths through the valve depending on the stage of operation. Separate sealing rings are placed in annular grooves in the bore between chambers. The seals engage the lands of the piston to block undesired water flow between the chambers. Several manufacturing steps are required to accurately place each sealing ring in the respective groove.

SUMMARY OF THE INVENTION

A piston for a control valve of a water treatment apparatus includes a body with a central portion from which one or more flanges project radially outward. Each flange has an outer peripheral surface extending around the central portion with an annular groove therein. The annular groove in undercut, thereby having a width that increases from the outer peripheral surface radially inward into the flange. A separate sealing ring is located within the annular groove of each flange and is captivated therein by the increasing width of the groove.

The control valve piston can be fabricated by forming the body using an investment casting process in which the grooves are defined by lost material, such as wax for example. This enables each groove to be undercut thereby forming a structure to captivate the sealing ring. After the body has hardened, it is placed in a second mold to form the sealing rings. This second mold has a cavity in which the valve piston body fits leaving small voids around each flange, that then are filled with the material for the sealing rings which flows into the flange grooves. After the sealing rings have hardened, the second mold is opened and the completed valve piston is removed.

By over molding the sealing rings into the grooves of the piston body, the sealing rings become locked within the grooves and are not easily removed, such as due to the force from the water flowing through the assembled control valve. This is a design concern because as the piston moves within the valve body to open and close paths through the control valve, water rushes past the piston flange edges creating forces that tend to dislodge the sealing rings.

DESCRIPTION OF THE OF THE DRAWINGS

DETAILED DESCRIPTION OF THE INVENTION

Figure 1:
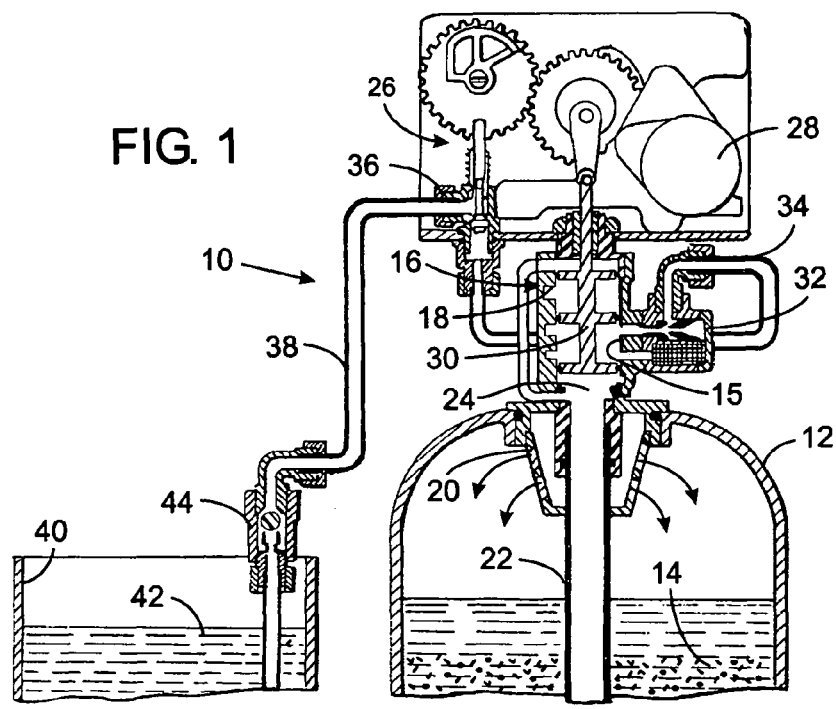
FIG. 1 is a cross sectional view through components of a water softener that incorporates a valve piston according to the present invention.

Referring initially to FIG. 1, a water softener 10 includes a treatment tank 12 which contains a bed 14 of ion exchange resin particles. A control valve 16 is fixed to the top of the treatment tank 12. In the service mode, hard water to be softened is supplied to an inlet passage 18 from which water flows to inlets 20 at the top of the treatment tank and then flows through the resin bed to absorb minerals from the water. An outlet conduit 22 extends through the bed 14 from a point adjacent the bottom of the treatment tank 12 to an outlet passage 24 in the control valve 16. Water that has been treated in the resin bed 14 flows through the outlet conduit 22 into the valve's outlet passage 24 from which the water exits the water softener 10 into the pipes in a building.

The resin bed 14 eventually becomes exhausted and no longer is capable of softening the water. Either periodically in response to a timer or in response to sensors detecting depletion of the resin bed, a controller 26 initiates a standard regeneration process. The controller 26 is fixed to the top of the valve and has a motor 28 that is adapted to drive a valve piston 30 within a circular bore 15 of the control valve 16 through a slowly moving and uninterrupted reciprocating cycle. As the piston 30 moves, the passages of the control valve 16 are connected in several combinations to direct water through different paths for the various stages of the regeneration process.

A typical resin bed regeneration process commences with a backwash step in which hard water is directed from the control valve into the outlet conduit 22 and upwards through the resin bed 14 finally exiting the water softener via a drain passage (not shown). The backwash step is followed by a brining step. The control valve 16 has an injector 32 that is connected by a conduit 34 through a shut-off valve 36 and a tube 38 to a brine tank 40. The brine tank 40 contains a brine solution 42 of a common salt, such as a sodium chloride or potassium chloride. In this stage of generation, a partial vacuum created by the flow of hard water through the injector 32 withdraws brine from the brine tank 40 through conduits 29 and 27 and into the treatment tank 12. The concentrated brine solution replaces the di-positive and tri-positive ions in the resin bed 14 with unipositive ions recharging the bed. When the contents of the brine tank 40 have been exhausted, a check valve 44 closes to prevent air from being injected into the system and water continues to flow through the injector 32 free of brine. This water propels the brine solution from the treatment tank 12 and then rinses the bed 14 to remove residual brine.

During the final stage of the regeneration process, the brine tank 40 is refilled with water and the softener resin bed 14 is purged. This is accomplished by feeding water into the brine tank 40 through the open shut-off valve 36 and into the treatment tank 12 through the inlets 20. Water passing through the resin bed 14 exits via the drain passage. Thereafter, the control valve 16 is returned to the position that places the water softener 10 into the previously described service mode in which the water for the building in treated.

Figure 2:
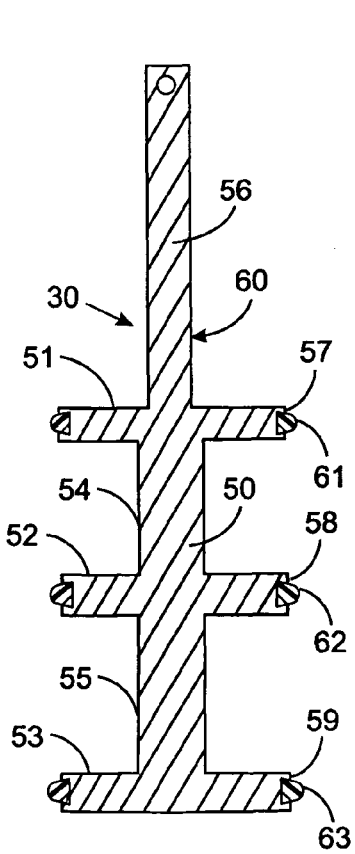
FIG. 2 is a cross sectional view through the valve piston.

With reference to FIG. 2, the control valve 16 has a novel piston 30 with a central portion, or shaft, 50 from which a plurality of circular disk-shaped flanges 51, 52 and 53 project radially outward, thereby forming recesses 54 and 55 between the flanges. A rod-like stem 56 extends axially from one end of the central portion 50 and is adapted for attaching to the mechanism of the controller 26, which moves the piston 30 within the bore 15 of the control valve 16 during the regeneration mode. The central portion 50, flanges 51-53 and the stem 56 form a body 60 of the valve piston 30 that preferably is fabricated of stainless steel or other corrosion resistant material.

Each flange 51, 52 and 53 has an outer circumferentially peripheral surface 57, 58 and 59, respectively, extending around the central portion 50 with an annular groove in that surface. A separate sealing ring 61, 62 or 63 is located within each of the annular grooves in the peripheral surface 57, 58 and 59, respectively. Preferably, the sealing ring 61-63 are made of rubber, such as a cross-linked thermal set rubber, or a resilient plastic, such as a thermoplastic elastomer. Each sealing ring 61-63 projects outward from the respective flange 51-53 and engages the inside surface of the control valve bore 15. That engagement prevents fluid within the recesses 54 or 55 from flowing between a flange and the surface of the valve bore 15 (see FIG. 1).

Figure 3:
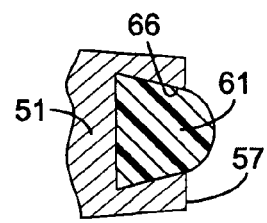
FIGS. 3-5 are enlarged views of three embodiments of seals integrated into the valve piston.

FIG. 3 illustrates the cross section through the sealing ring 61 located in the groove 66 in the peripheral surface 57 of one of the flanges 51. The annular groove 66 has a dove tail cross section that is undercut so that the interior surface is wider than the opening of the groove through the peripheral surface 58 of the flange 52. The undercut captivates the sealing ring 61 within the annular groove 66 and prevents the sealing ring from being pulled out of that groove by forces produced by water flowing through the assembled control valve 16. This is a design requirement because as the piston 30 moves within the bore 15 opening and closing paths through the control valve, water rushes past the peripheral surfaces 57 of the piston flanges creating forces that tend to dislodge the sealing rings.

Figure 4:
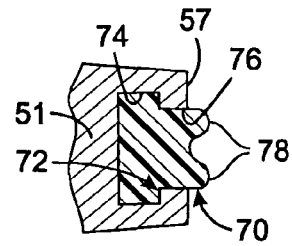

FIG. 4 illustrates a second style of sealing ring 70 located in a groove 72 in the peripheral surface 58 of one of the flanges 52. The groove 72 has T-shaped cross section in which an inner region 74 has a width that is larger than the width of the groove in an outer region 76 at the peripheral surface 58 of the flange. The sealing ring 70 is enlarged in that inner region 74, thereby captivating the sealing ring in the groove 72. This style of sealing ring 70 has a pair of lobes 78 which engage the interior surface of the valve bore 15.

Figure 5:
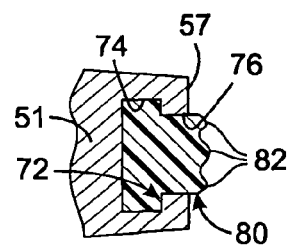

A third style of sealing ring 80 is shown in FIG. 5 located in an identical annular groove 72 in one of the flanges 52. This style of sealing ring 80 has three lobes 82 which engage the interior surface of the valve bore 15.

The valve piston 30 is fabricated by first producing the body 60 using an investment casting process, such as lost wax casting. The mold for this casting process includes material, such as wax, which defines the grooves in the outer circumferentially peripheral surfaces of the flanges 51-53. Because this material can be easily removed after the material of the body 60 has hardened, the grooves can be undercut to provide a groove in which the sealing rings are locked in place, as described previously. After the valve body 60 has hardened, it is placed in a second mold for forming the sealing rings 61-63. This second mold has a cavity in which the body 60 of the valve piston 30 fits leaving small voids around each flange, which then are filled with the material for the sealing rings which flows into the entire groove 57-59 in the respective flange 51-53. After the sealing rings have hardened, the second mold is opened and the completed valve piston 30 is removed.

By over molding the sealing rings 61-63 into the grooves of the metal portion of the piston 30, the sealing rings become locked within the grooves and are not easily removed, such as due to the force from the water flowing through the assembled control valve 16. If non-locking type grooves were used with resilient sealing rings merely stretched around the flanges 51-56 and then released into the grooves, the sealing rings might not be held in place securely enough to resist the water flow force that tends to dislodge the sealing rings.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A control valve of a water treatment apparatus including a piston, the piston comprising:
   a body having a central portion from which at least one flange projects radially outward, each flange has a peripheral surface extending around the central portion with an annular groove therein, the annular groove has a width that increases from the peripheral surface radially inward into the flange; and
   a different sealing ring within the annular groove of each flange and captivated therein by increasing width of the groove, wherein each sealing ring entirely fills the respective annular groove.

2. The control valve as recited in claim 1 further comprising a stem projecting axially from the body.

3. The control valve as recited in claim 1 wherein the body comprises a plurality of flanges.

4. The control valve as recited in claim 1 wherein each sealing ring is fabricated of a resilient material.

5. The control valve as recited in claim 1 wherein the body is fabricated by an investment casting process.

6. The control valve as recited in claim 1 wherein each sealing ring is molded into annular groove in the body.

7. The control valve as recited in claim 1 wherein at least one sealing ring has a plurality of lobes projecting away from the flange.

8. The control valve as recited in claim 1 wherein at least one sealing ring has a curved surface extending outward from the flange.

9. The control valve as recited in claim 1 wherein at least one groove has a T-shaped cross section.

10. The control valve as recited in claim 1 wherein at least one groove has a dove tail cross section.

11. The control valve as recited in claim 1 wherein each sealing ring is formed by molded rubber.

12. The control valve as recited in claim 1 wherein each sealing ring is formed of a resilient plastic.

13. The control valve as recited in claim 1 wherein the body is a single piece of material.

14. The control valve as recited in claim 1 wherein the body is fabricated of a single piece of stainless steel.

* * * * *